United States Patent [19]

Barksdale

[11] Patent Number: 5,084,119
[45] Date of Patent: Jan. 28, 1992

[54] LAP SEAM AND METHOD FORMING SAME

[75] Inventor: Daniel L. Barksdale, Brownsburg, Ind.

[73] Assignee: Bridgestone/Firestone, Inc., Akron, Ohio

[21] Appl. No.: 599,318

[22] Filed: Oct. 17, 1990

[51] Int. Cl.[5] .............................. C09J 5/04; C09J 5/10
[52] U.S. Cl. ..................................... 156/157; 156/314; 428/57; 428/58; 428/189; 428/194
[58] Field of Search .................. 428/57, 58, 189, 194; 156/157, 314, 280, 305

[56] References Cited

U.S. PATENT DOCUMENTS

| | | | |
|---|---|---|---|
| 3,770,556 | 11/1973 | Evans et al. | 161/39 |
| 4,192,116 | 3/1980 | Kelly | 428/57 X |
| 4,289,552 | 9/1981 | Hammer | 156/73.4 |
| 4,379,114 | 4/1983 | Fujiki et al. | 264/248 |
| 4,445,955 | 5/1984 | Struve | 156/153 |
| 4,654,098 | 3/1987 | Miller | 156/157 |
| 4,671,975 | 6/1987 | Smialowicz | 428/57 X |
| 4,774,115 | 9/1988 | Ruehl et al. | 428/57 X |
| 4,849,268 | 7/1989 | Backenstow et al. | 428/57 |
| 4,855,172 | 8/1989 | Chiu | 428/57 |

Primary Examiner—George F. Lesmes
Assistant Examiner—D. R. Zirker
Attorney, Agent, or Firm—Ernst H. Ruf

[57] ABSTRACT

A liquid tight seam for an overlapping seam of two waterproof elastomeric membranes of a roof covering and the method of forming the seam. The overlapped edge portions of the two membranes are sealed by an intervening adhesive layer. A second adhesive layer is applied along the seam and covers adjacent exposed areas of the two membranes and stepped edges thereof which form the seam. Next, a bead of sealant is applied along the seam and over adjacent portions of the second adhesive layer. This seam and method eliminates washing and cleaning the seam areas with solvents before applying the sealant thereby enhancing seam quality and strength.

9 Claims, 1 Drawing Sheet

LAP SEAM AND METHOD FORMING SAME

BACKGROUND OF THE INVENTION

1. Technical Field

The invention relates to waterproof roofing systems and in particular to an improved seam for overlapping waterproof covering membranes. Even more particularly, the invention relates to such a lap seam and method of forming the same which eliminates the use of solvents and gases for cleaning the edges of the membrane adjacent the seam before applying a bead or layer of sealant.

2. Background Information

The use of waterproof membranes formed of various elastomeric compositions such as EPDM, are gaining wide acceptance in the roofing industry. These membranes eliminate the use of ballast gravel and asphalt impregnated sheets as the waterproof covering and their inherent disadvantages, such as increased cost and weight. However, one of the problems with the use of such elastomeric waterproof membranes is the ability to provide a satisfactory and long-lasting seam where two adjacent sheets of the membranes are joined, usually in a lapped seam arrangement.

Various types of seams and sealing arrangement therefor are provided, as well as methods of installing the same, in order to provide a satisfactory seam, both for the roofing industry and for other types of products, wherein sheets of waterproof material are joined together. Examples of such prior art seam constructions and forming methods are shown in the following patents.

U.S. Pat. No. 3,770,556 discloses a closure sleeve that is adhesively joined together in an overlapped relationship together with means to prevent the overlapping edge from peeling. The sleeve is joined by means of an adhesive layer and a cover sheet which is adhesively bonded over the overlapped edge. A foil cover sheet, a plastic cover sheet and a fabric cover sheet then are used.

U.S. Pat. No. 4,289,552 discloses a method for welding together thermoplastic sheets in an overlapped relationship. A double faced adhesive holds a pair of thermoplastic sheets together until a welding bead in a thermoplastic state is applied to the seam from an applicator.

U.S. Pat. No. 4,379,114 discloses the bonding of two waterproof sheets to form a joint that has a curved wave configuration in cross section. Cure tape is positioned between the waterproof sheets and a press member of a cushion material that facilitates the curved configuration of the final lap joint is used. Heat and pressure then are applied to the overlapped sheets to cause the cure tape to deform into the desired configuration.

U.S. Pat. No. 4,445,955 discloses a method for joining together thermoplastic sheets in an overlapped relationship in which the sheets are welded together by an extruded thermoplastic material.

U.S. Pat. No. 4,654,098 is believed to be one of the closest known prior art to the present invention. This patent discloses a method for joining sheets of heat resistant fabric in an overlapped relationship. The marginal edge portions of the sheets are coated with an adhesive layer and the two sheets are then joined afterwhich an overcoat of a thermoset urethane polymer is applied over the overlapped sheet onto the adjacent sheet. The overcoat covers a portion of the adhesive coated marginal edge of the seam.

U.S. Pat. No. 4,849,268 also is of some interest with respect to the present invention in that it discloses a liquid containment system that is formed by adhering together individual membrane sheets in an overlapping relationship to form a lap seam. The membranes have cement layers that bond to each other afterwhich a bead of sealant is positioned at the outermost edge portion of the seam between the membranes.

Another common method and lap seam construction for many waterproof membranes used in a roof covering of which the present invention is an improvement thereof, consists of initially securing the lapped edges of the membranes together by use of an intervening sealant. Next, the matted talc or mica which is on the roofing membrane is removed by scrubbing the edges adjacent the seam with unleaded gas or a compatible solvent, in order that a caulking bead or sealant, which is next applied along the seam, will bond to the edge portions of the membrane adjacent the formed seam. Although this method provides a satisfactory seam, it is preferable for many applications to eliminate the use of a cleaning solvent used to clean the area adjacent to the seam, due to its possible contamination of the lap seam adhesive occasionally resulting in wrinkling and opening of the seam and reduction in the seam strength. Furthermore, the elimination of some solvents is desirable because of its contact with roofing personnel, environmental considerations and its affect on both the lap seam adhesive and externally applied lap sealant. The application of these cleaning solvents also involves additional cost for the solvent, and the labor for applying the same along the lap seam.

Therefore, the need exists for an improved lap seam and method of forming the seam at the application site, preferably on a roof using elastomeric covering membranes, which eliminates the use of a cleaning solvent along the lap seam, while providing a lap seam of increased strength and field life.

SUMMARY OF THE INVENTION

Objectives of the invention include providing an improved lap seam and method of forming the same which eliminates the hand washing or cleaning with a hydrocarbon solvent or reducing solvent of the areas of the overlapped membranes adjacent the seam, eliminating possible seam contamination from the gas or washing fluid, as well as eliminating solvent contact with roofing personnel.

A still further objective of the invention is to provide such an improved lap seam and method which will preseal the edge of a fresh seam to enhance seam quality and strength by use of a thin coat of an adhesive compatible with the adhesive between the overlapped membrane edge portions thereby reducing possible deterioration of the sealing adhesive.

Still another objective of the invention is to provide such a lap seam and method which uses existing adhesive and caulking sealant materials which have been field tested and are compatible with each other and with the waterproof membrane, thereby eliminating possible harmful interaction between the various materials and the roofing membrane.

Still another objective is to provide such an improved lap seam and method which can be performed easily by roofing personnel without requiring expensive equipment and skillful operations, and which can be accomplished in a relatively short period of time and with a minimum amount of materials, thereby reducing the cost of the roofing installation while providing an enhanced seam construction.

These objectives and advantages are obtained by the improved lap seam construction of the invention, the general nature of which may be stated as including first and second waterproof membranes having edge portions in overlapped relationship forming a stepped seam; a first adhesive layer between the overlapped edge portions of said membranes to join said edge portion together; a thin second adhesive layer coating an outer surface of the edge portion of the first membrane and extending continuously along and coating the stepped seam and coating an exposed area of the second membrane adjacent the seam; and a bead of sealant extending along the seam and covering at least a portion of the second adhesive layer.

These objectives and advantages are further achieved by the improved method of the invention, the general nature of which may be stated as including a method of sealing a lap seam between two overlapped sheets of waterproof roofing membrane including the steps of overlapping edge portions of first and second sheets of waterproof membranes; adhesively securing together the overlapped edge portions of the two membranes with a first adhesive to form a seam therebetween; applying a thin layer of a second adhesive to an exposed top surface of the overlapped edge portion of one of the membranes and to an exposed surface of the other of said membranes adjacent the seam, and to said seam formed therebetween; and applying a bead of sealant along and over portions of the second adhesive layer along said seam.

BRIEF DESCRIPTION OF THE DRAWINGS

A preferred embodiment of the invention, illustrative of the best mode in which applicant has contemplated applying the principles, is set forth in the following description and is shown in the drawings and is particularly and distinctly pointed out and set forth in the appended claims.

Similar numerals refer to similar parts throughout the drawings.

DESCRIPTION OF THE PREFERRED EMBODIMENT

Figure 1:
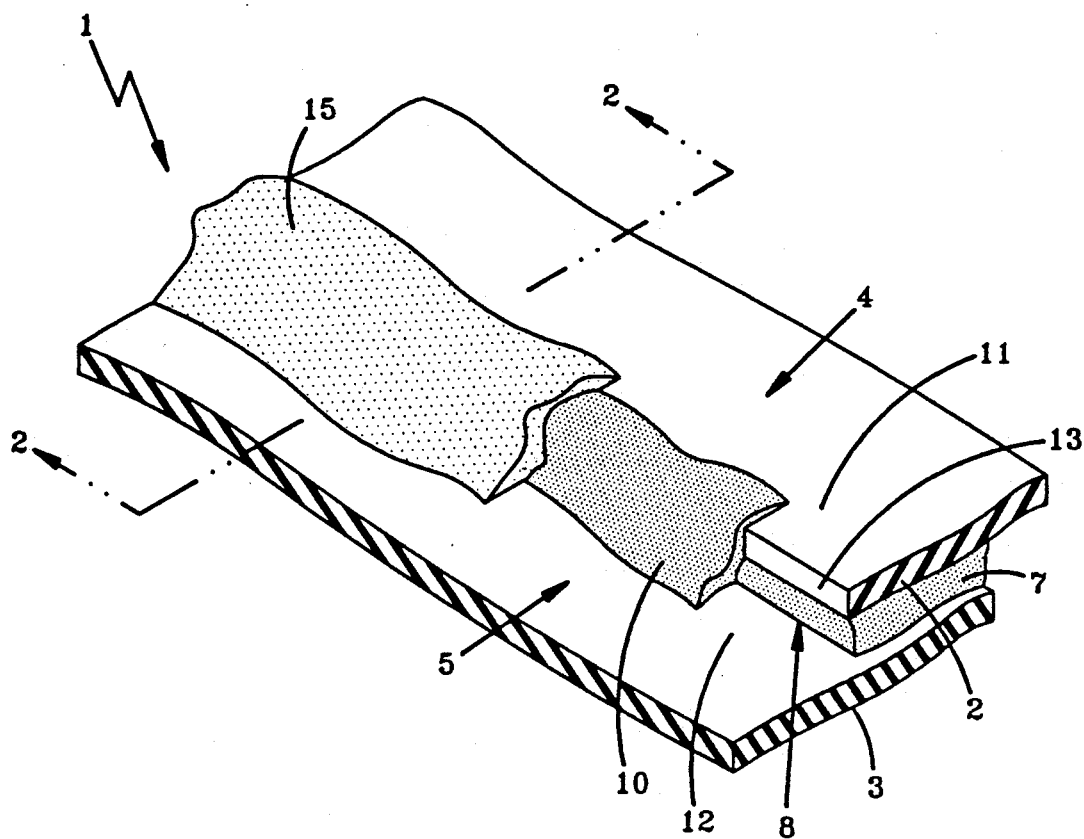
FIG. 1 is a fragmentary diagrammatic perspective view showing the improved lap seam of the invention with various portions broken away showing the various layers of the improved seam.
Figure 2:
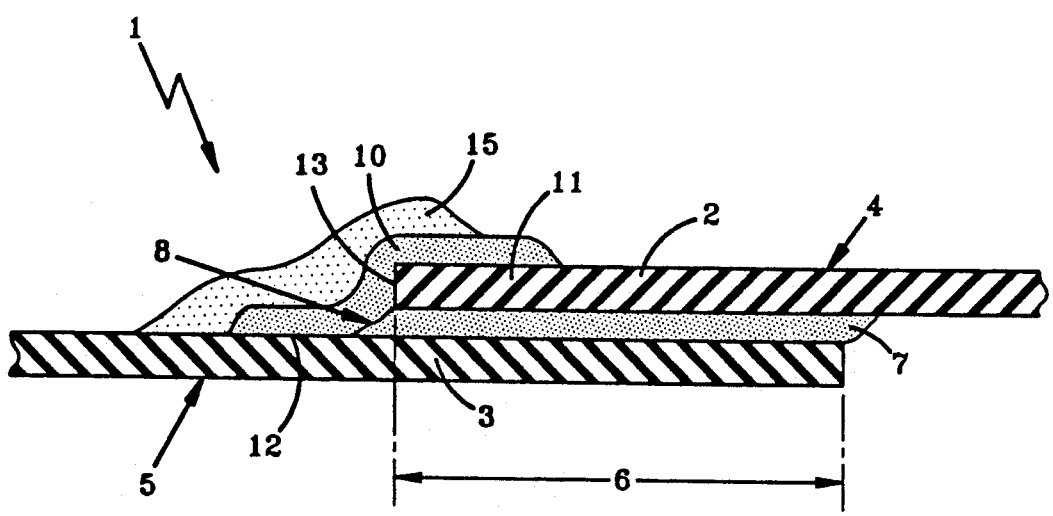
FIG. 2 is a fragmentary sectional view taken on line 2—2, FIG. 1.

FIG. 1 shows the lap seam of the present invention with various portions thereof broken away to clearly show the method of forming the seam in accordance with the present invention. The improved lap seam is indicated generally at 1, and is formed by overlapping edge portions 2 and 3 of two sheets of an elastomeric waterproof membrane indicated generally at 4 and 5, respectively. As shown in FIG. 2, the overlapped area 6 preferably is approximately three inches or more, with portions 2 and 3 being sealed together by a layer of adhesive 7 to form a stepped overlapped seam edge 8 which runs linearly along the roof as shown in FIG. 1.

In a preferred embodiment, membranes 4 and 5 preferably are formed of a reinforced or unreinforced EPDM or similar type of waterproof membrane, with adhesive 7 being formed of a butyl based contact adhesive. An example of membranes 4 and 5 is sold by Bridgestone/Firestone, Inc. under its trademark RUBBER-GARD. An example of adhesive 7 also is distributed by Bridgestone/Firestone, Inc. under the designation SA1065, SA meaning splice adhesive. Adhesive 7 also can be a solid butyl based adhesive tape without effecting the invention.

The above described formation of seam 8 is well known in the art. However, in accordance with the invention, a thin coating of an adhesive 10 is applied over a top surface area 11 extending along membrane 4 and over a top surface area 12 of membrane 5 extending along seam 8.

Adhesive 10 preferably will be of the same type of adhesive as adhesive layer 7, that is, formed of a liquid butyl based contact adhesive, which can be applied easily with a paint brush or similar applicator by roofing personnel. Preferably, adhesive covered areas 11 and 12 will each be approximately 1 inch in width, and will extend throughout the longitudinal length of the seam. Adhesive 10 also will cover exposed edge 13 of top membrane 4 forming a continuous strip of adhesive extending along surface 11 and onto and along surface 12 to completely cover seam 8.

Adhesive 10 generally will be applied after adhesive 7 is fully dried or cured, which for the preferred type of adhesive described above, will require approximately 4 hours. However, in accordance with the invention, surface areas 11 and 12 of the membranes as well as membrane edge 13 are not cleaned or washed with a solvent, stiff brush or by other means, as heretofore required in prior lap seam formations. Instead, upon complete drying of adhesive 7, a workman will apply adhesive 10, preferably with a paint brush, roller or the like.

Upon adhesive layer 10 drying, which will take approximately 4 hours, a strip of sealant 15 is applied along the seam covering portions of adhesive layer 10 on both membranes 4 and 5 and over the adhesive coated membrane edge 13 as shown particularly in FIG. 2. Sealant 15 is applied in a usual manner with a caulking gun or other type of sealant applicator well known in the art. After application of sealant 15, the seam is completed, all of which has been accomplished without the use of any cleaning solvent which could dissolve the adhesive and weaken the seam, and without the use of manually actuated cleaning brushes or the like acting upon the membrane areas adjacent the seam, as heretofore required in the prior art. Furthermore, the use of adhesives 7 and 10 preferably of the same basic chemical composition, avoids problems which could occur if two different adhesives are used. This also enables the adhesives to merge and become a continuous sealing layer. Furthermore adhesives 7 and 10 are of the type which have been field tested and found to be compatible with the membranes 4 and 5. An example of the preferred type of sealant 15 or caulking material to be used in the present invention, is an EPDM based material such as sold by Bridgestone/Firestone, Inc. and identified as its product No. LS3029, with LS meaning lap sealant.

Thus, the improved lap seam and method of the invention, provides an extremely satisfactory, long lasting and durable seam, formed with a minimum number of components, all of which are readily compatible with each other, and which prevents wrinkling and opening of the seam. Most importantly, this improved seam and method eliminates the use of a cleaning solvent or a manual brush cleaning before applying the sealant or caulking strip along the overlapped seam edge.

Accordingly, the improved lap seam and method of the invention is simplified, provides an effective, safe, inexpensive, and efficient seam and method which achieves all the enumerated objectives, provides for eliminating difficulties encountered with prior seams, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved lap seam and method is constructed and used, the characteristics of the construction and of the method, and the advantageous, new and useful results obtained; the new and useful structures, devices, elements, arrangements, parts, combinations and method steps, are set forth in the appended claims.

I claim:

1. A method of sealing a lap seam between two overlapped sheets of a waterproof roofing membrane including the steps of:

overlapping edge portions of first and second sheets of waterproof membranes;

adhesively securing together the overlapped edge portions of the two membranes with a first adhesive to form a stepped seam therebetween;

applying a thin layer of a second adhesive directly to an exposed top surface of the overlapped edge portion of one of the membranes and continuously along and over the stepped seam and directly to an exposed surface of the other of said membranes adjacent the stepped seam, without mechanically or chemically cleaning said exposed surfaces and said stepped seam; and applying a bead of sealant along and directly over portions of the second adhesive layer along said seam.

2. The method defined in claim 1 including providing the first and second adhesives of the same material.

3. The method defined in claim 1 including providing the first adhesive as a solid and the second adhesive as a liquid.

4. The method defined in claim 2 including forming the first and second adhesive of a butyl based contact adhesive.

5. The method defined in claim 1 including applying the second layer of adhesive in a generally 2 inch strip, equally distributed on the first and second membranes.

6. The method defined in claim 1 including forming the sealant of a EPDM or butyl based material.

7. The method defined in claim 1 including overlapping the first and second membranes approximately three inches.

8. The method defined in claim 1 including allowing the first adhesive to dry at least 4 hours before applying the second adhesive layer.

9. The method defined in claim 1 including allowing the second adhesive layer to dry at least four hours before applying the sealant.

* * * * *